United States Patent [19]

Tani et al.

[11] Patent Number: 5,664,087
[45] Date of Patent: Sep. 2, 1997

[54] METHOD AND APPARATUS FOR DEFINING PROCEDURES TO BE EXECUTED SYNCHRONOUSLY WITH AN IMAGE REPRODUCED FROM A RECORDING MEDIUM

[75] Inventors: Masayuki Tani, Katsuta; Kimiya Yamaashi, Hitachi; Koichiro Tanikoshi, Hitachi; Shinya Tanifuji, Hitachi; Masayasu Futakawa, Hitachi, all of Japan

[73] Assignee: Hitachi, Ltd., Tokyo, Japan

[21] Appl. No.: 834,779

[22] Filed: Feb. 13, 1992

[30] Foreign Application Priority Data

Feb. 13, 1991 [JP] Japan .................. 3-019744

[51] Int. Cl.⁶ .................................. G06T 13/00
[52] U.S. Cl. ...................................... 345/473
[58] Field of Search ............................ 395/152, 154, 395/155, 156, 157, 158, 159, 160, 161, 650, 135; 358/183

[56] References Cited

U.S. PATENT DOCUMENTS 4,449,198  5/1984  Kroon et al. .................. 364/900
4,905,094  2/1990  Pocock et al. ................. 358/342
5,237,648  8/1993  Mills et al. .................... 395/133

OTHER PUBLICATIONS

SIGGRAPH '80 Conference Proceedings, Jul. (1980), pp. 32–42.
Communications of the ACM, vol. 32, No. 7, Jul. (1989) pp. 802–810.

*Primary Examiner*—Robert W. Beausoliel, Jr.
*Assistant Examiner*—Stephen Elmore
*Attorney, Agent, or Firm*—Antonelli, Terry, Stout & Kraus, LLP

[57] ABSTRACT

An objective is to effectively specify a method of synchronizing a video image with computer processing. At step 1200, a frame in which a script is desired to be defined is selected and displayed on the editing region 200 of a display screen. Then, at step 1210, when an item "script" is selected from the editing menu 130, the script editor is opened. At step 1220, a desired process is described in the script editor in terms of a predetermined language. If the description has no error, it is stored (step 1230). When an item "execute" is selected from the main control menu 120, a video image is reproduced, a frame for which a process has been defined is displayed, and at the same time the defined process is executed.

26 Claims, 11 Drawing Sheets

METHOD AND APPARATUS FOR DEFINING PROCEDURES TO BE EXECUTED SYNCHRONOUSLY WITH AN IMAGE REPRODUCED FROM A RECORDING MEDIUM

BACKGROUND OF THE INVENTION

This invention relates to a system for effecting synchronization between a video image reproduced by a video reproducing apparatus, such as a video tape player or a video disk player, and the computer processing data representing the image, and particularly to a system for producing graphics, such as text and figures, by use of a computer, synchronizing the produced pictures and the video images within a recording medium, and displaying a composite image.

This system has many applications in various different fields, such as presentation, education, training and video production. For example, in a presentation which is made in meetings, it may be desirable not only to use a conventional overhead projector or slide for the explanation of drawings, but also to use video images and computer graphics for a more impressive presentation. By combining a computer, such as a personal computer or work station, a large display and a video disk player, it is possible to produce and display graphics for presentation together with reproduced and controlled video images.

In this system, in order that the video images recorded by a video camera will be more understandable to the viewers, text and graphics for supplementary explanation of the video images are produced by a computer and displayed together with the video images. For example, while video images recorded in a car race are being displayed, the map of the circuit which has been produced by graphics is compounded with the video images on the display, so that it can be known where the currently displayed car is running in the course.

The operator is able to define the contents to be processed in synchronism with the video image by use of a coordinates-input unit such as a keyboard or a mouse, while viewing the display screen. Moreover, the operator is able to draw graphics directly on the video image and display them together with the video image in a composite manner while viewing the display screen.

The video disk has become an object of public attention as a large-capacity image information recording medium. The video disk can store video information in an amount of tens of thousands of pictures. Also, by the use of the video disk player, it is possible to reproduce any one part of the video information from the video disk as a still picture and to continuously reproduce a series of images as a motion picture to be displayed. In general, each picture composing a motion picture is called a frame.

Some video disk players can be controlled to reproduce video images using a computer. This video disk player is connected through standard communication means such as a RS232C part, to the computer. The computer transmits a command to the video disk player, thereby making it possible to control and acquire information as follows:

(1) To reproduce any one of the frames from the video disk as a still picture;
(2) To start the reproduction of video images from a specified frame;
(3) To stop the currently reproduced images at an arbitrary time point;
(4) To transmit information from the video disk to the computer when a previously specified frame is reproduced; and
(5) To send a request for information about the currently reproduced frame from the video disk.

A system for controlling a video disk player using a computer is described in SIGGRAPH '80 Conference Proceedings, July (1980), pp 32–42. In this system, the operator orders the computer to control the direction (normal direction or opposite direction), speed, start and stop operations of the reproduction and so on on the video disk player. However, once the computer commands the video disk player to start reproduction, the video disk player itself continues to reproduce video images until the computer commands the video disk player to stop the reproduction. During the reproduction, the processing in the computer is not synchronized with the reproduction of video images.

In order to execute the computer processing in synchronism with the video images reproduced by the video disk player, it is generally required to produce a computer program which includes the following steps.

Step 1: monitor the video reproduction until a frame to be processed by the computer is reproduced.
Step 2: start a specified process just when the frame has been reproduced.

A typical example of the process to be executed by the computer in synchronism with video images is the display of graphics. The video images recorded by a video camera are compounded and displayed with a text, figures and so on which have been produced by use of a computer or the like, as seen in television broadcasting. Particularly, the text compounded and displayed with a video image is called a Telop and is frequently used.

So far a Telop, figures and so on have been produced independently of the video images recorded by the camera, and compounded therewith upon broadcasting or recording. In other words, the Telop and figures are not produced while the compounded results are being watched by the operator. After the Telop and figures are completely produced, they are compounded with the video image and examined. Therefore, it is difficult to produce the Telop and figures in association with the position, movement, color and so on of the objects within the video image.

A system, in which the text and graphics produced by the computer can be synchronously compounded and displayed with the video images reproduced from the video disk player, is presented in Communications of the ACM, Volume 32, Number 7, July (1989), pp 802–810. In this system, texts and graphics can be displayed in synchronism with the video image reproduced by the video disk player, but a method for defining the display and synchronization of the text and graphics with the video image, particularly the user interface is not disclosed.

The method of compounding video images with graphics upon reproduction has been discussed above. On the other hand, a method is often used in which compounded video images and graphics are recorded on a single medium (for example, a video disk or a disk of the computer), and is simply reproduced. This method needs no synchronization and compounding processing upon reproduction and thus has an advantage that simple apparatus and processing can be used. Particularly, under the performance of the present computer, it is often impossible to display complicated graphics in synchronism with video image in real time. In this case, it is inevitable to provide the previously compounded, video images before reproduction. However, this method cannot change the contents of graphics to be compounded in accordance With the situation upon reproduction. For example, there is a case in which it is desirable to change the contents of graphics to be compounded and displayed in accordance with the age and nationality of viewers. For English and American persons, English notes are compounded and displayed, but for Japanese, Japanese explanations are given. In addition, comic pictures are compounded and displayed for kindergarten students, and large letters are used for old men. In the method in which the previously compounded video images are provided, it is necessary to provide many recording media, or video disks for each case. Even in that case, the video disks cannot be switched swiftly upon reproduction, or it can be said to be a poor adaptation-to-circumstances system.

Accordingly, the prior art has the following drawbacks.

(1) In order for the computer to execute the process in synchronism with the video images, it is necessary to develop for each application a program for monitoring the progress of video image reproduction and for invoking a specified process when a specified frame is reproduced.

(2) Since graphics are produced independently of the video image before the graphics are compounded with the video image, it is difficult to produce the graphics associated with the position, movement, color and so on of the objects within the video image.

(3) In methods in which the video image and graphics are previously compounded, it is difficult to interactively change the graphics in accordance with the situation upon reproduction. In addition, as compared with methods in which video images and graphics are previously and separately stored, and upon reproduction, compounded and displayed, many recording media are necessary.

SUMMARY OF THE INVENTION (1) It is an object of the invention to provide a video synchronization processing method and apparatus capable of synchronizing video images and computer processing by only selecting a frame of the video images and defining the contents of the processing to be synchronized with the display of the frame.

(2) It is another object of the invention to provide a video synchronization processing method and apparatus capable of compounding and displaying graphics in synchronism with a video image by only drawing the graphics on the displayed video image.

The object (1) of the invention can be achieved by a method including the following steps.

(1) Image selection step: to select at least one of a plurality of images stored in a video disk or the like.

(2) Process definition step: to define a desired process to be executed in synchronism with the display of the image selected at the image selection step.

(3) Process storing step: to store the contents of the process defined at the process definition step.

(4) Process execution process: to execute the process in synchronism with the display of the stored image after the definition of the process at the steps (1) to (3).

Moreover, the object (2) of the invention can be achieved by the following steps included in the method for compounding on the display the video image reproduced from a video reproducing apparatus such as a video disk player capable of reproducing each frame of video images, and graphics produced by a computer.

(1) Frame selection step: to select at least one of video images which can be reproduced from the video reproducing apparatus.

(2) Frame display step: to display the frame selected at the frame selection step.

(3) Drawing graphics step: to draw graphics on the display on which the frame is being displayed at the frame display step.

(4) Graphics storing step: to store the graphics drawn at the drawing graphics step in association with the frame (called as the graphics-defined frame) displayed while the graphics are being drawn.

(5) Compound display step: to compound and display the graphics stored in association with the frame in synchronism with the later reproduction of the graphics-defined frame.

A video image frame is selected and the desired computer processing to be executed is defined. Thereafter, when the video image is reproduced, the defined processing is executed by the computer in synchronism with the display of the selected frame. Thus, the operator need only define the desired processing. It is not necessary to produce each program for the synchronization execution control that the computer processing is started while the video progression is being monitored. In addition, by only selecting the video image frame when the processing content is defined, it is possible to simply specify when the processing is executed.

Moreover, when a frame is selected, the frame is indicated on the display. When graphics are drawn by use of a drawing tool on the display on which the frame is being displayed, the drawn graphics is compounded and displayed with the frame in synchronism with the later reproduction of the frame of video image. Thus, since the graphics to be compounded and displayed are directly drawn on the displayed frame, it is possible to simply draw the graphics in association with the color, position, size and so on of the objects within the video image. Moreover, since the drawing of graphics directly on the frame implicitly specifies when the graphics should be displayed, the synchronization between the graphics and the video image can be simply specified.

DESCRIPTION OF THE PREFERRED EMBODIMENTS OF THE INVENTION

As one embodiment of the invention, a presentation system will be described with reference to FIGS. 1 to 16. The object of this system is to aid in a presentation to be produced by compounding video images stored in a video disk and graphics produced by a computer.

Figure 2:
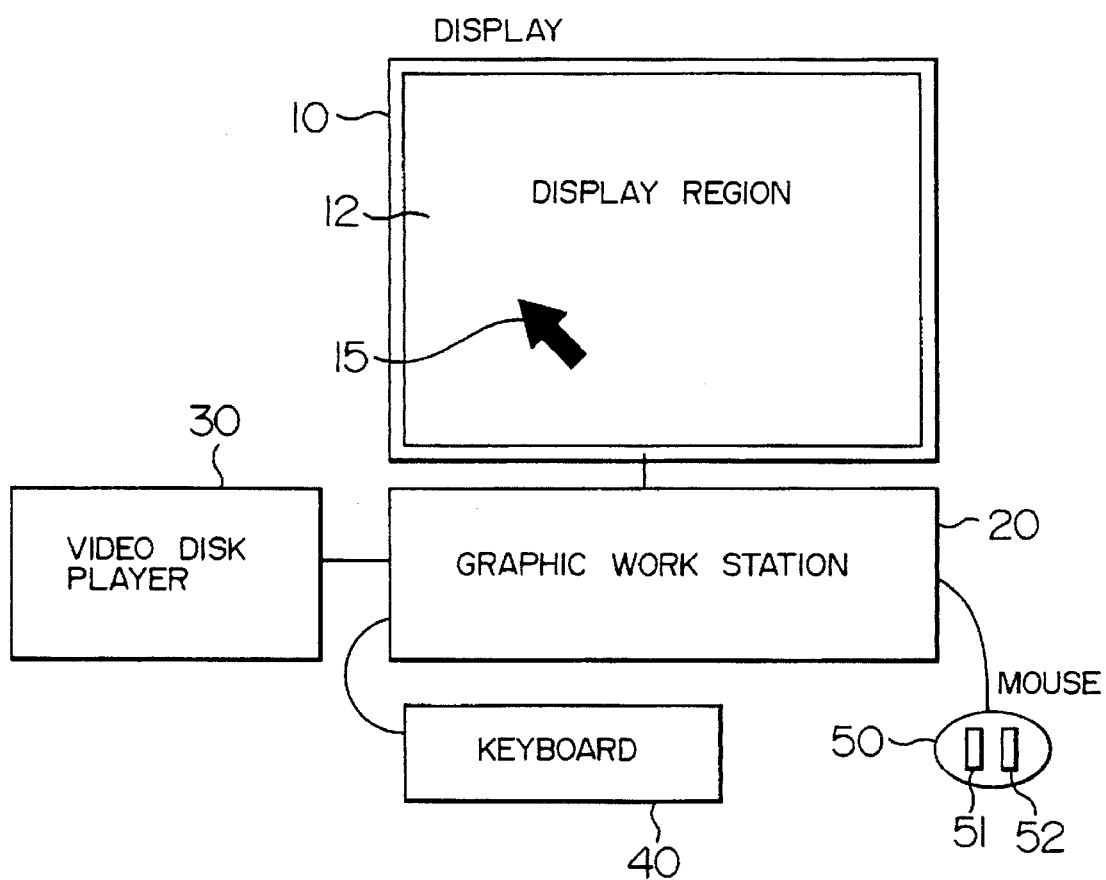
FIG. 2 is a diagram of the hardware construction for executing the presentation system in this embodiment.

FIG. 2 shows the summary of-the hardware construction of this embodiment. In FIG. 2, there are shown a display 10, a display region 12 of the display 10, a pointer 15 displayed on the display region 12, a graphic work station 20 capable of causing graphics to be displayed at a high speed, a video disk player 30 for recording and reproducing video images, a keyboard 40 for inputting letter codes into the graphic work station 20, a mouse 50 for specifying the position of the pointer 15 on the display region 12, and buttons 51, 52 mounted on the mouse. The pointer 15 can be moved about within the display region 12 in association with the movement of the mouse 50.

In this embodiment, the mouse 50 is used to perform the following operations.

Click operation: the button 51 or 52 of the mouse 50 is pushed down and released from the pushed-down state without moving the mouse 50. This operation is used chiefly for specifying a location within the display region 12 or select a displayed object, such as a menu or a figure.

Drag operation: the button 51 or 52 of the mouse 50 is pushed down, and the mouse 50 is moved with the depressed button kept down. The drag operation is stopped by releasing the button from the depressed state. The drag operation can specify two points within the display region 12. In other words, the position of the pointer 15 can be specified at the time of starting the drag Operation (when the button is pushed down), and at the time of stopping the drag operation (when the button is released).

The mouse 50 is operated to place the pointer 15 on the display region 12 at a displayed object and the mouse 50 is Operated to click. This operation is said "to click (or drag) the displayed object".

Figure 3:
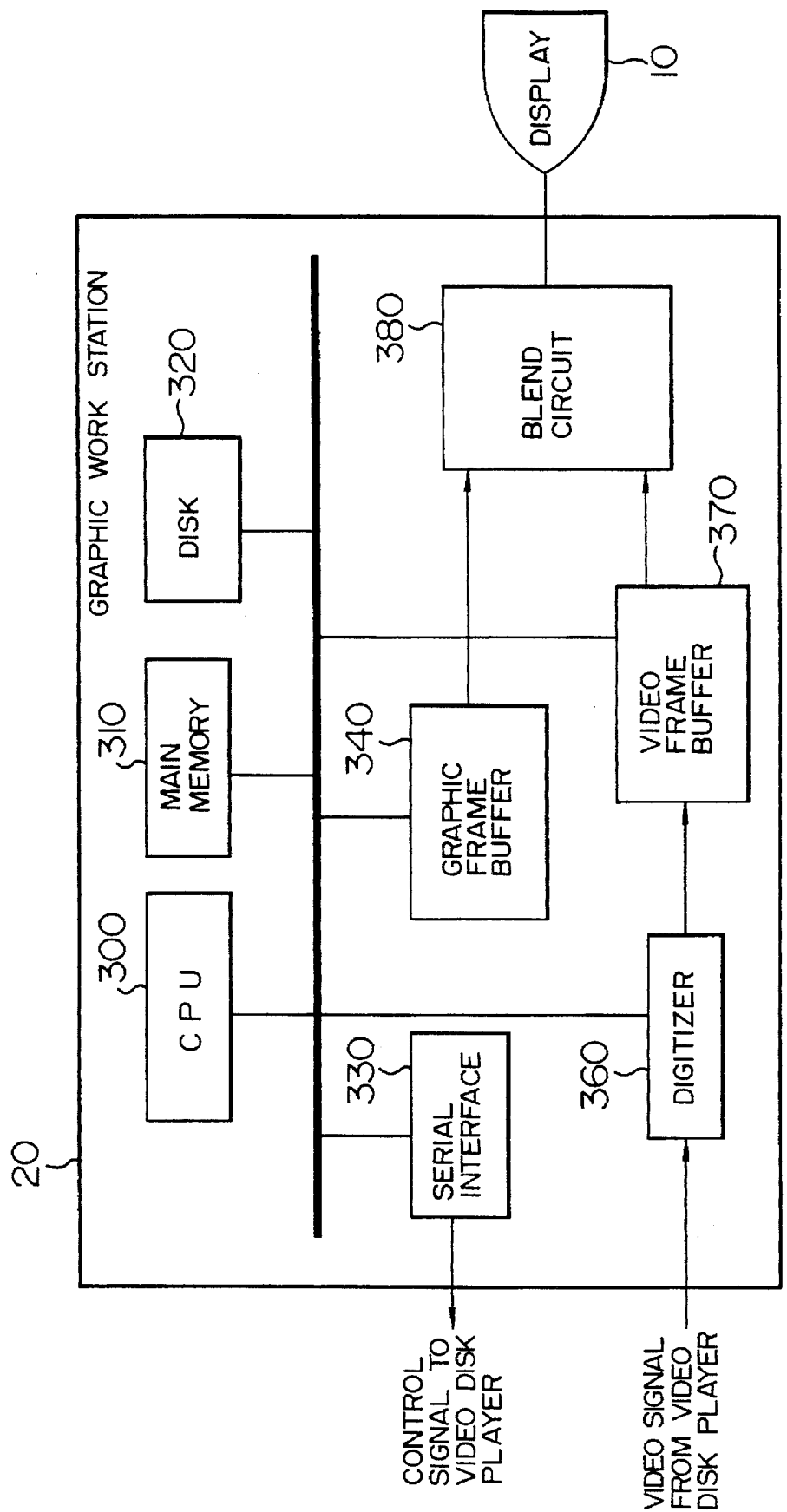
FIG. 3 is a block diagram of the construction of the graphics work station for executing the program of the presentation in this embodiment.

FIG. 3 shows the summary of the hardware construction of the graphic work station 20. In FIG. 3, there are shown a CPU 300, a main memory 310, a disk 320, a serial interface 330 such as RS232C, a graphics frame buffer 340 for storing display data generated from the CPU 300, a digitizer 360 for digitizing input analog video information, a video frame buffer 370 for storing the digital video information produced from the digitizer 360, and a blend circuit 380 for compounding the contents of the graphic frame buffer 340 and video frame buffer 370 and displaying the compounded information on the display 10.

The graphic work station 20 controls the video disk player 30 through the serial interface 330 so that it receives arbitrary video information as an analog video signal from the video disk. The video information is supplied frame by frame and displayed as a still picture or it is supplied continuously in a series of frames and displayed as a motion picture.

When the video information from the video disk player 30 is supplied to the graphic work station 20, it is compounded with the graphics produced at the graphic work station, and then displayed on the display.

The graphic frame buffer 340 has stored therein data of the colors R, G, B and data designated as α-value, which are associated with each pixel on the display 10. The α-value is used for specifying the way of compounding the video information within the video frame buffer 370 and the graphic display data within the graphic frame buffer 340 in association with each pixel on the display 10.

The function of the blend circuit 380 can be expressed by $$d = f(g, v, \alpha) \tag{1}$$

where g and α are respectively the color information and α-value of a pixel within the graphic frame buffer 340, v is the color information of the pixel corresponding to g within the video frame buffer 370, and d is the color information of the pixel resulting from compounding g and v. This system employs the following equation as the function f.

$$f(g, v, \alpha) = \{255 - \alpha)v\}/255 \tag{2}$$

Where α, v, g and f are entegers from 0 to 255, and [ ] is a Gaussian mark and denotes the maximum integer not exceeding the number in [ ]. Of course, the function f may be expressed by another equation.

Hereinafter, the video image is the image which the video disk player has reproduced particularly unless otherwise defined. The graphics are the video images which the graphic work station 20 has generated.

Figure 1:
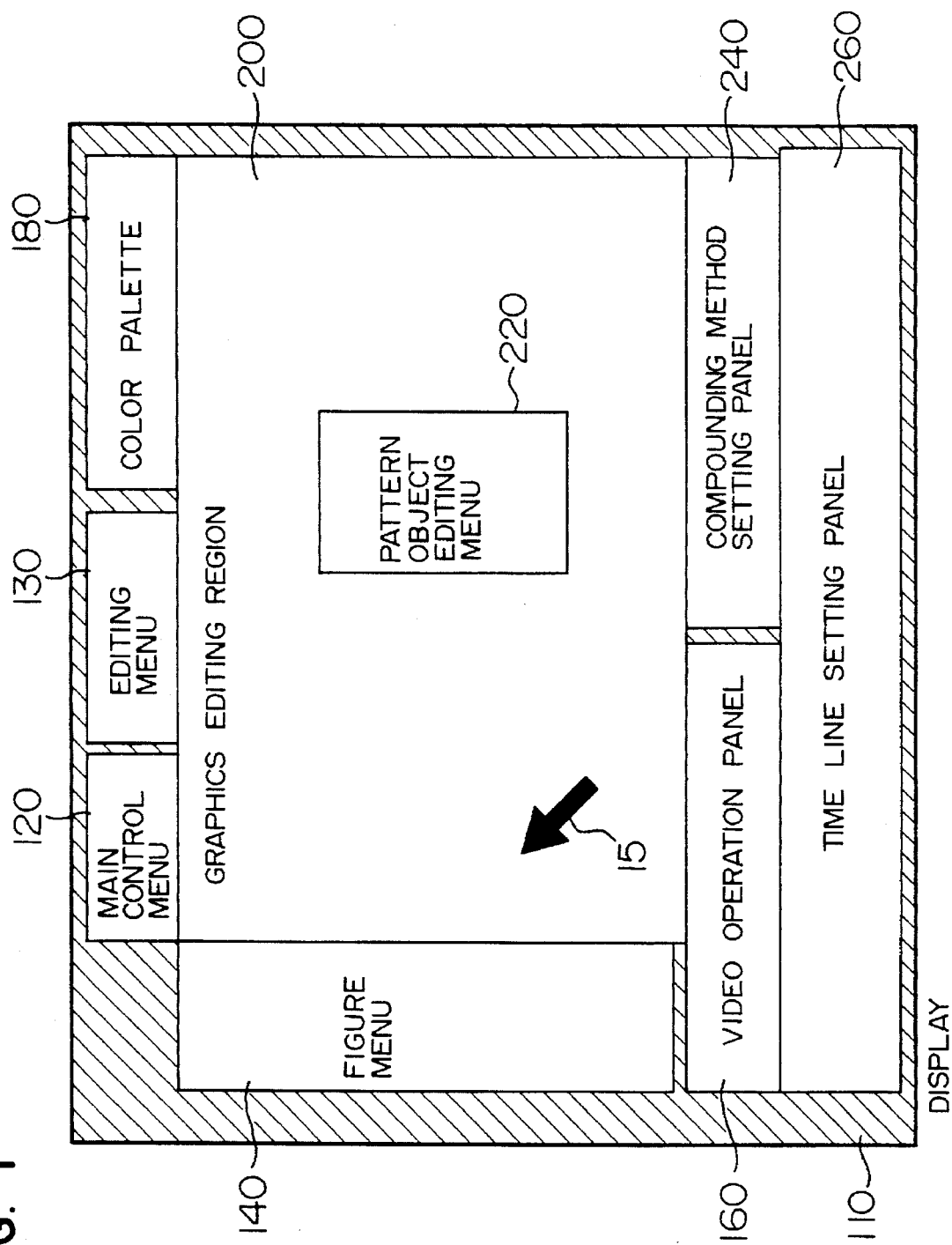
FIG. 1 is a diagram of one embodiment of the invention showing the layout on the screen.

FIG. 1 shows the summary of the layout on the display screen at the time of editing in this embodiment. Shown at 110 is a display region of the display 10, 120 is a main control menu, 140 is a figure menu, 160 is a video operation panel, 180 is a color palette for specifying a color of a pattern, 200 is an editing region, 220 is a figure object editing menu, 240 is a compound method setting panel, and 260 is a time line setting panel. On the editing region 200 are displayed the video image which is inputted from the video disk player 30, and the pattern or figure which is produced by use of the figure menu 140 and the figure object editing menu 220. The frame currently displayed on the editing region 200 is called the current frame.

The items of the main control menu 120 and the functions thereof are shown below.

Store: store the contents now under editing in the disk as a file.

Open: read the result of editing stored in the disk 320 as a file.

Execute: execute the contents now under editing.

Execution control: the execution control mode setting sheet is opened.

Quit: quit the present system.

The items of the figure menu 140 and the functions are shown below.

Letter: the function to draw letters. After selecting this item, click one point within the editing region 200 using the mouse 50 and input letters from the keyboard 40, then the inputted letters are drawn from the clicked position. Move the pointer 15 to the place other than the row of letters which are now being inputted, and click the mouse 50, then the letter-row inputting operation ends.

Straight line: the function to draw a straight line. After selecting this item, drag the mouse 50 within the editing region 200, then a straight line is drawn to connect the position of the pointer 15 at the start of drag and the position of the pointer 15 at the end of drag.

Rectangle: the function to draw a rectangle. After selecting this item, drag the mouse 50 within the editing region 200, then a rectangle is drawn to have vertexes of opposite angles at the position of the pointer 15 corresponding to the start of drag and at the position of the pointer 15 corresponding to the end of the drag.

Circle: the function to draw a circle. After selecting this item, drag the mouse 50 within the editing region 200, then a circle is drawn to have the center at the position of the pointer 15 corresponding to the start of drag and to have a point on the circumference at the position of the pointer 15 corresponding to the end of drag.

Polygonal line: the function to draw a polygonal line. After selecting this item, repeat the movement and click of the mouse 50 within the editing region 200, and finally click twice at the same position, then a polygonal line is drawn which is formed by straight lines connecting the points of the pointer 15 at which the mouse has been clicked.

Poligon: the function to draw a poligon. After selecting this item, repeat the movement and click of the mouse 50 within the editing region 200, and finally click twice at the same position, then a polygon is drawn which is formed by straight lines connecting the points of the pointer 15 at which the mouse has been clicked, and connecting the final point and first point of the pointer 15.

A one of the figures drawn on the editing region 200 can be selected and moved. When the mouse 50 is moved to move the pointer 15 onto a desired figure and the button 51 is clicked, that figure is selected. In addition, when the mouse 50 is dragged on the editing region 200, all the figures can be selected which are included in the rectangular region having vertexes of opposite angles at the drag-start position of the pointer 15 and the drag-end position of the pointer 15. When the mouse 50 is moved to move the pointer 15 onto a desired figure and dragged with its button 51 pushed down, the figure is moved together with the pointer 15.

When the pointer 15 is on the editing region 200 and the button 52 of the mouse 50 is pushed down, the pattern object editing menu 220 is displayed. When the mouse 50 is moved with its button 52 pushed down so that the pointer 15 is moved onto a desired item of the pattern object menu 220, and when the button 52 is released from the depressed state, the desired item is selected. When the button 52 is released, the figure object editing menu 220 disappears from the display. The items of the figure menu and the functions thereof are shown below.

Delete: the selected figure is deleted and at the same time it is stored in a paste buffer.

Copy: the selected figure is copied into the paste buffer.

Stick: the contents of the paste buffer are drawn at the position of the pointer 15 which has been displayed when the mouse 50 has latest been clicked.

Rotate: the selected figure is rotated through a desired angle around a desired point.

Magnify/reduce: the selected figure is magnified or reduced to a desired extent.

Compound: a plurality of selected figures are grouped, and the grouped figures can be edited as one figure.

Decompose: the grouped figures are divided into the respective figures.

Figure 4:
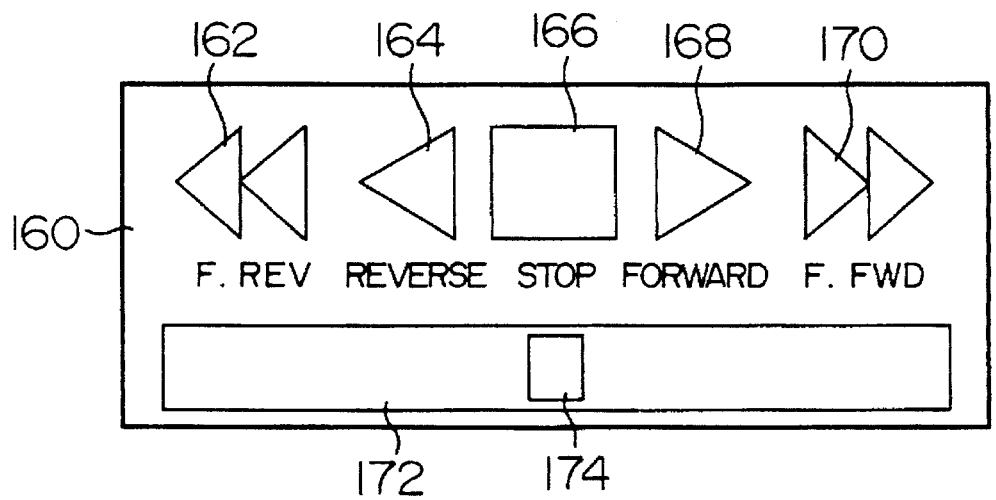
FIG. 4 is a diagram of the displayed video console panel.

FIG. 4 shows the displayed moving picture operating panel 160 for operating the video disk player 30. In FIG. 4, there are shown buttons 162 to 170 which are operated by clicking the mouse 50 so as to control the way (direction and speed) of reproduction on the video disk player 30. The reproduced video image is displayed on the editing region 200. Each button functions as follows.

168: reproduces at the standard speed in the forward direction.

170: reproduces at a high speed in the forward direction.

164: reproduces at the standard speed in the reverse direction.

162: reproduces at a high speed in the reverse direction.

166: stops the reproduction. The frame at the time of having stopped is kept displayed as a still picture on the editing region 200

In FIG. 4, there are shown a slider 172 for more finely specifying the way (direction and speed) of the reproduction by the video disk player 30 and a knob 174 of the slider 172. When the pointer 15 is placed on the knob 172 and the mouse 50 is dragged left and right, the speed and direction of the reproduction can be specified stepwise. When the knob 172 is moved right from the center, the reproduction speed is increased in the forward direction. On the contrary, when the knob 172 is moved left from the center, the reproduction speed is increased in the reverse direction. When the knob 172 is set at the center of the slider 170, the video disk player 30 is stopped.

Figure 5:
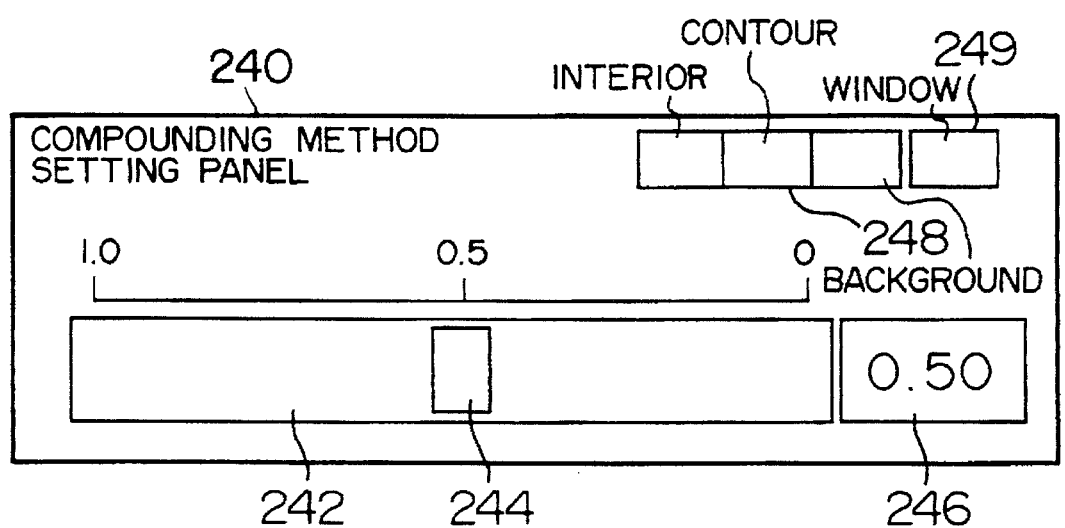
FIG. 5 is a diagram of the display compound method setting panel.

FIG. 5 shows the displayed image of the compounding method setting panel 240. The compounding method setting panel 240 is used to specify how to compound on the screen the selected figure on the screen and the video image reproduced from the video disk player 30.

In FIG. 5, there are shown a slider 242 for specifying the transparency of the selected figure, a knob 244 of the slider 242, a transparency display region 246 for displaying the present transparency of the selected figure, a menu 248 for selecting the transparency of one of different parts of the selected figure, and an icon 249 for making only the inside of a closed figure transparent.

The transparency takes a value within the range from 0 to 1.0. When the transparency of a certain figure X is x, the $\alpha$-value of the graphic frame buffer 340 corresponding to the figure X is set according to the following equation.

$$\alpha = [255(1-x)] \qquad (3)$$

Where [ ] indicates a Gaussian symbol and is the maximum integer not exceeding the value within the brackets [ ].

The menu 248 has three items, "interior", "contour" and "background". The "interior" is selected for specifying the transparency of the interior of the closed figure such as a rectangle or circle. The "contour" is selected for specifying the transparency of the contour of the closed figure. When a closed figure is selected, the item, "interior" is selected as a default from the menu 248. For other figures than the closed figure, such as a straight line and polygonal line, the item "contour" is automatically set without operation of menu 248. When "background" is selected, it is possible to specify the transparency of the other region (called the ground region) than the figures within the editing region 200. At this time, the contour of a figure or the transparency of the interior of a closed figure is specified for each figure.

When a closed figure is selected and when the icon 249 is clicked, the transparency of the interior of the selected closed figure is set to 1, the transparency of the contour of the figure to 0 and the transparency of the ground region to 0. Therefore, the video image from the video disk player 30 can be seen through the interior of the closed figure. When a figure other than the closed figure is selected, clicking the icon 249 will be neglected.

When a figure within the editing region 200 is selected by using the mouse 50, the value of the transparency of the selected figure is indicated on the transparency display region 246, and the knob 244 of the slider 242 is moved to the position corresponding to the transparency.

The transparency of the selected figure is changed by dragging the knob 244. The display on the editing region 200 is also immediately changed in accordance with the set transparency. In addition, when the transparency display region 246 is clicked, the value of the transparency can be numerically inputted from the keyboard 40.

Figure 6:
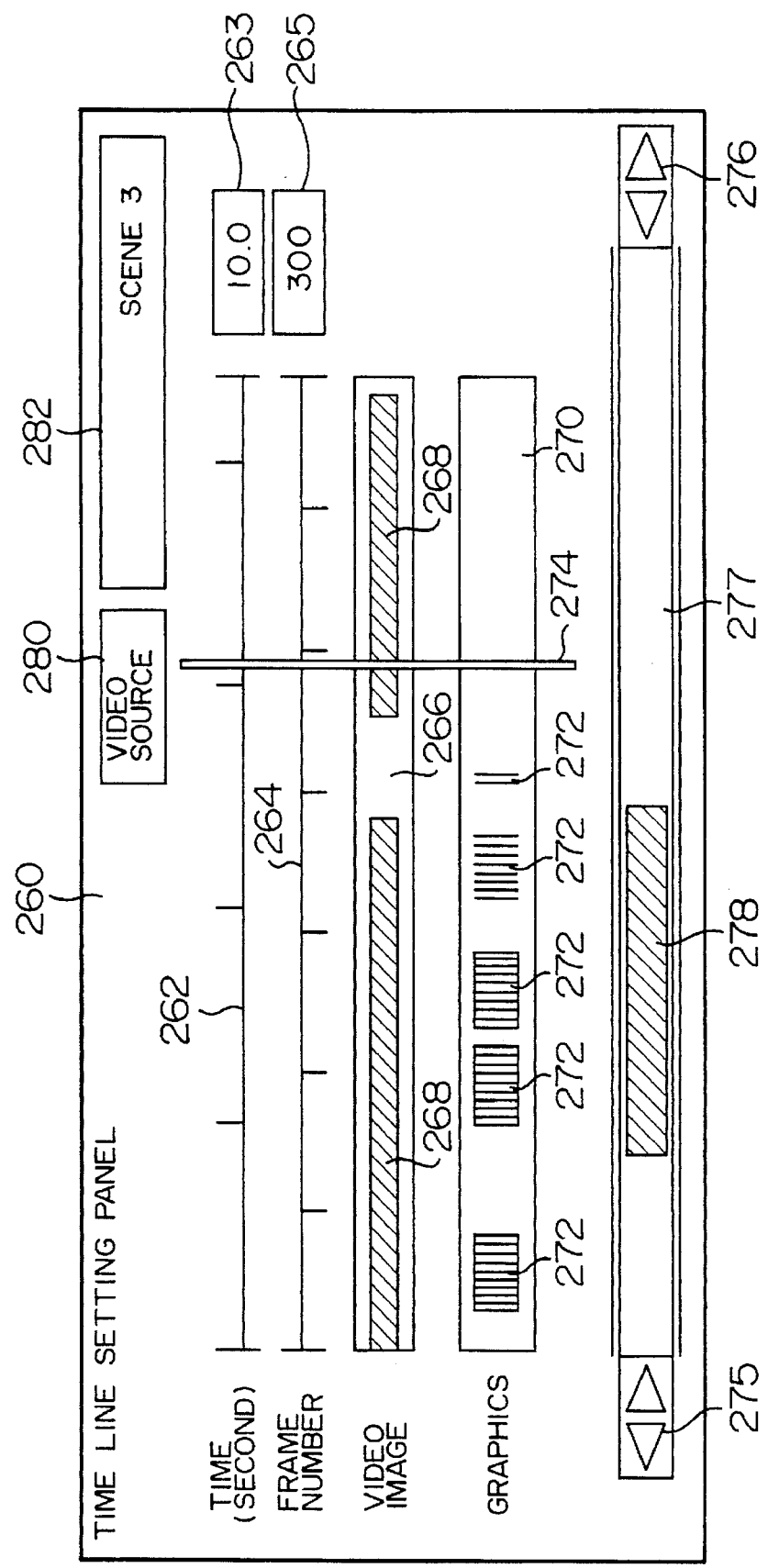
FIG. 6 is a diagram of the display time line setting panel.

FIG. 6 shows the displayed state of the time line setting panel 260. The chief functions of the time line setting panel 260 are (1) to combine several video image sources to form a video image, (2) to get the summary of all of editing situations and (3) to select the frame to be edited.

In FIG. 6, there are shown a timebase 262 for indicating the time, expressed in seconds, when a certain frame is displayed after the beginning, a region 263 for indicating the value on the timebase of the currently displayed frame, a frame number axis 264 for indicating the order of a certain frame from the beginning, a region 265 for indicating the value of the currently displayed frame on the frame number axis, a bar display 268 for indicating that the video image from the video disk player 30 is displayed on the frame, a bar display 272 for indicating that the graphics to be displayed has been defined, a needle 274 for indicating the position of the currently displayed frame, a bar graph 278 for indicating the range which the timebase 262 and the frame number axis 264 occupy within the whole video image, a region 277 for indicating the range of the whole video image, scroll menu 275, 276 for moving the bar graph 278 left or right, a video source icon 280 for selecting one of the video sources stored in the video disk, and a region 282 for indicating the name of the video source in which the currently displayed frame is included.

When the video source icon 280 is clicked, the video source menu is displayed. The video source menu is the list of video source names which are recorded on the video disk in the video disk player 30. When one video image source is selected from the video image source menu, the selected video image source is inserted at the position of the currently displayed frame (the position of the needle 274). The video image source menu includes an item of "register" except the video image source names. When the item "register" is selected, the video image source register sheet is displayed. In the video image source register sheet, a new video image source can be registered in the video image source menu by specifying the range (the first frame number and the last frame number) of the video image which is desired to be registered, and the name.

The frame of the frame number indicated by the needle 274 is displayed on the display 10. When the needle 274 is dragged left or right by the mouse 50, the frame to be displayed can be selected.

The items of the editing menu 130 and the functions will be given below.

All copy: when this item is selected, an all copy command is executed. The all copy command orders to copy the same figure as drawn in the frame A into the frames from the frame A in which a figure has been lately drawn to the currently displayed frame B.

Interpolation: When this item is selected, an interpolation command is executed. The interpolation command orders to make interpolation by use of the figures of frames A and B as key frames when the figure of frame A in which the figure has been lately drawn has been copied into the present frame B, and when the drawing operation on the frame B has been finished.

Script: When this item is selected, a script editor is called. The script is defined for the currently displayed frame. Upon execution, the script is executed when the frame for which the script has been defined is displayed.

Figure 7:
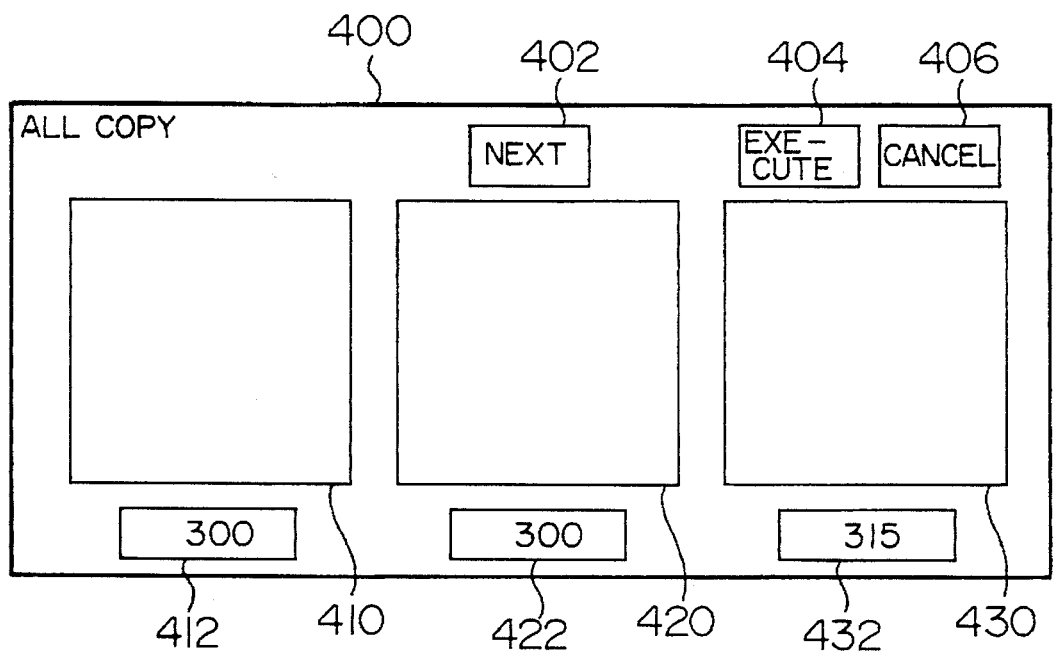
FIG. 7 is a diagram of the display all-copy setting panel.

When the all copy command is executed, and when another figure is defined on the frame into which the copy is bade, an all copy setting panel 400 is displayed on the display region 12. FIG. 7 shows the displayed state of the all copy setting panel 400. The frame A of which the copy is made is displayed in a reduced size in a region 410. The current display frame B is displayed in a reduced size in a region 430. The frame, in which a figure between frames A and B and different from that in frame A is defined, is displayed in a region 420. When there are a plurality of frames in which different figures are defined, the frame nearest to the frame A is displayed, and when an icon 402 is clicked, the frames in which different figures are defined can be sequentially displayed in a reduced size in the region 420. At regions 412, 422 and 432 there are displayed the numbers of the frames which are being displayed in the regions 410, 420 and 430. If the setting on the all copy setting panel 400 has been confirmed, the icon 404 is clicked for the execution of all copy. When all copy is not desired to execute, the icon 406 is clicked for stopping all copy.

Figure 8:
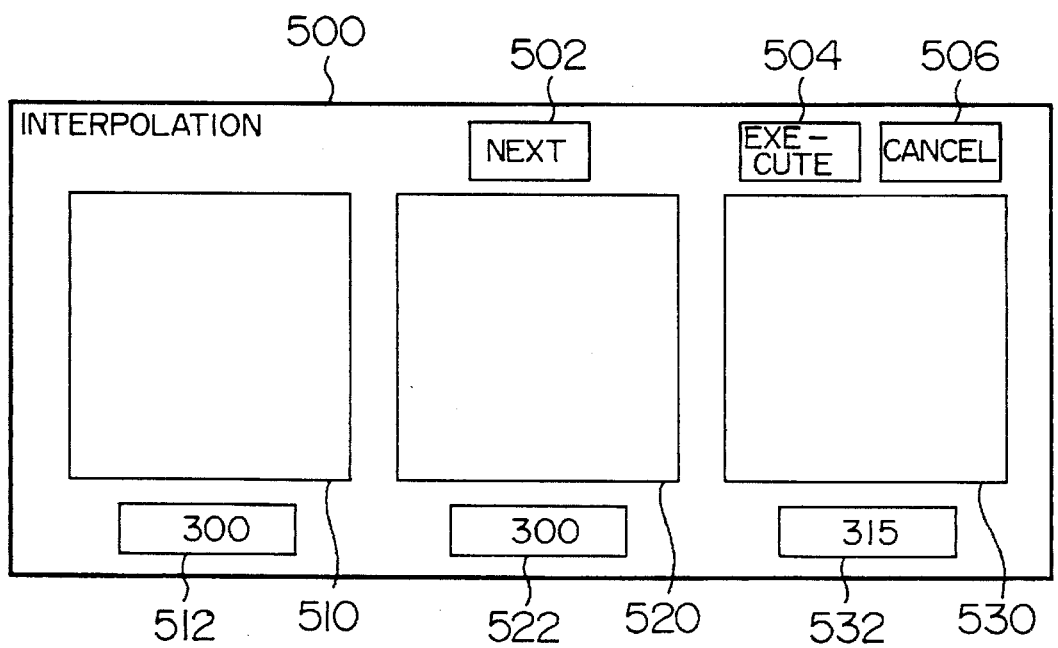
FIG. 8 is a diagram of the display all-copy setting panel.

When a different figure is defined in the frame to be interpolated upon execution of an interpolation command, an interpolation setting panel 500 for confirming whether the execution of the interpolation command is continued or not is displayed on the display region 12. FIG. 8 indicates the displayed state of the interpolation setting panel 500. The frame A of which the copy is made is displayed in a reduced size in a region 510. The currently displayed frame B is displayed in a reduced size in a region 530. The frame between the frames A and B and in which a different figure from that in frame A is defined is displayed in a region 520. When there are a plurality of frames in which different figures are defined, the frame nearest to the frame A is displayed, and when an icon 502 is clicked, the frames in which different figures are defined can be sequentially displayed in a reduced size in the region 520. The numbers of the frames displayed in the regions 510, 520 and 530 are respectively displayed in regions 512, 522 and 532. If the setting on the interpolation setting panel 500 is confirmed, an icon 504 is clicked for executing the interpolation. When the interpolation is not desired, an icon 506 is clicked, stopping the interpolation.

Figure 9:
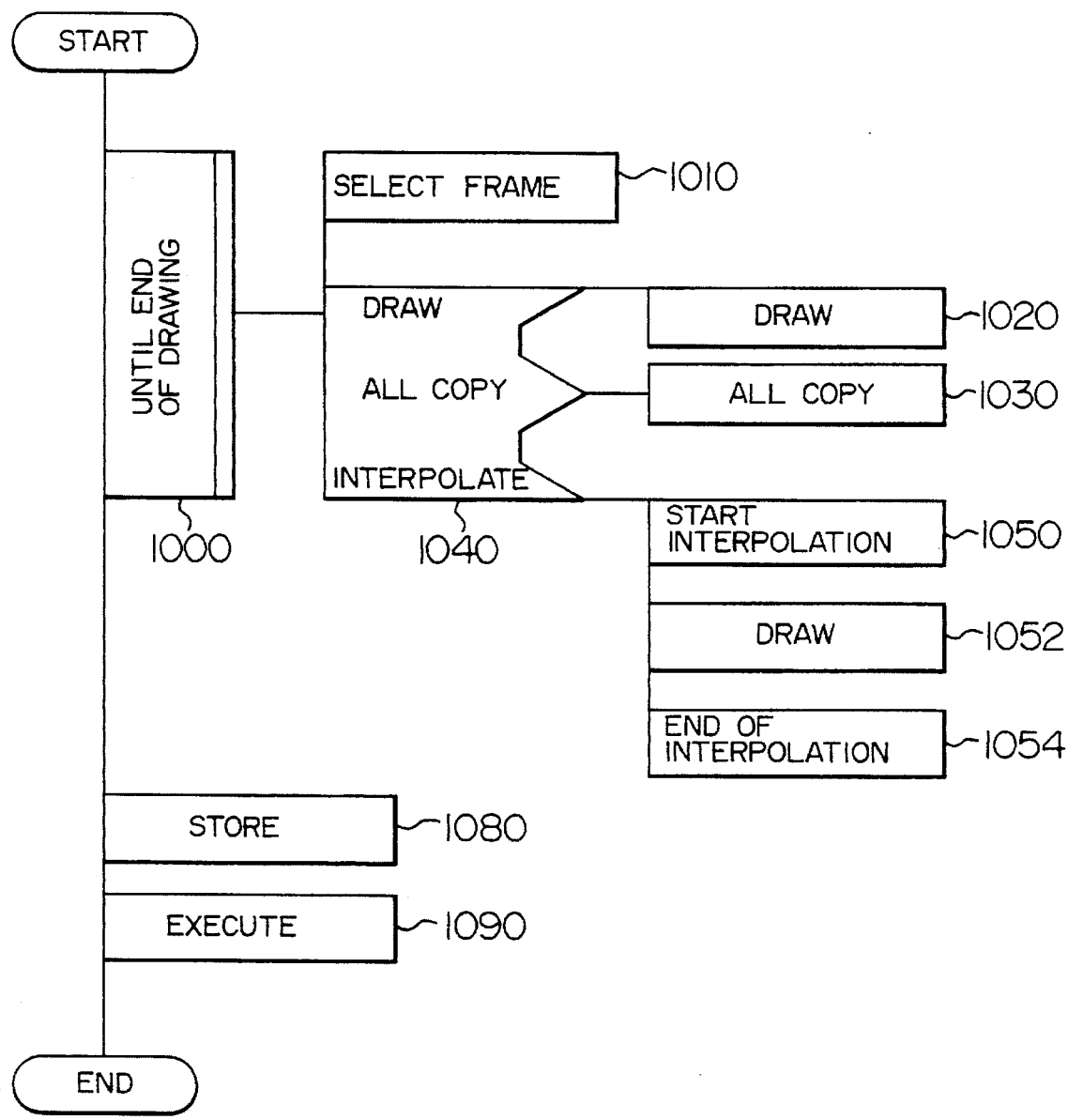
FIG. 9 is a flowchart of the procedure of producing the graphics which are compounded and displayed with the video image.

FIG. 9 shows an example of the procedure for drawing graphics which are to be compounded with video images. First, a frame which is desired to be compounded with graphics is selected (at step 1010). If the video operation panel 160 is used, the frame can be selected in the same way as operating the video deck. The operation buttons 162 to 170 and slider 172 are operated to reproduce the video images from the video disk in the forward direction or reverse direction and to detect a desired frame. When a desired frame has been detected, the stop button 166 is pushed to stop the reproduction. The selection of frames can also be made by use of the time line setting panel 260. On the time line setting panel 260, the needle 274 is dragged left or right to match with a desired frame number or desired time, and the frame is selected. The selected frame is displayed on the editing region 200. When the video image frame from the video disk does not correspond to the frame specified by the needle 274 (when no bar display 268 is present under the needle 274), nothing is displayed on the editing region 200.

When a figure is drawn from the beginning, there is no picture to be entirely copied or interpolated, and thus steps 1030 and 1050 are skipped over and directly a step 1020 is started. At the step 1020, a figure is drawn and edited by use of the pattern menu 140 and pattern object editing menu 220. During drawing, the video image of the frame selected at the step 1010 is displayed as a still picture in the editing region 200. The transparency of the default of the figure is set to 1.0, and the figure is written on the video image. When the drawn figure is selected by the mouse 50 and the transparency is set by the compound method setting panel 240, the figure is redisplayed in accordance with the set transparency.

After the drawing of graphics to be displayed on one frame has been finished, the program returns to step 1010, where the next frame to be compounded with the graphics is selected.

When the video images are displayed at the rate of 30 frames per second, each frame is displayed only for 1/30 second. Therefore, when the graphics are drawn only in one frame, the graphics are only instantaneously displayed. When graphics are desired to be displayed for a constant time, the same graphics must be drawn over many frames. In that case, at step 1010 the frames of the same graphics have been selected. Then, "all copy" is selected from the editing menu 130, and the all copy command is executed (at step 1030). When the all copy command has been executed, the previously drawn graphics are copied into the current frame and all frames ranging from the current frame to the previously drawn frame.

When an animation is produced in which graphics are moved in accordance with the progress of video images, graphics are produced to be somewhat different frame by frame. If, for example, a figure is moved for several seconds from left to right, the same figure must be shifted right little by little so that pictures are produced over several tens of frames. In the case of producing such an animation, if the interpolation command is executed, the animation can be produced by only specifying the graphics of the first and last frames.

FIGS. 10 to 13 show examples of the production of animation by use of the interpolation command. In FIGS. 10 to 13, 600, 610, 620, 630 and 640 represent n th, (n+1) th, (n+2) th, (n+3) th and (n+4) th frames, respectively. The frame 600 is the first frame of the animation and the frame 640 is the final frame of the animation.

Figure 10:
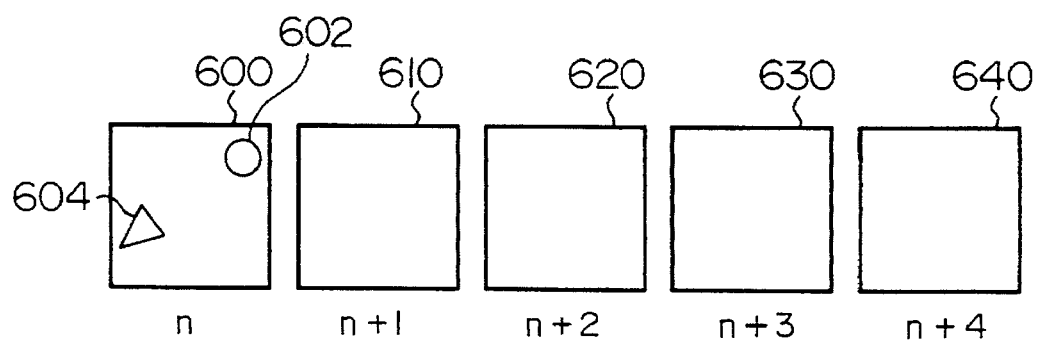
FIG. 10 is a diagram showing the relation between the graphics before interpolation and the frame.
Figure 11:
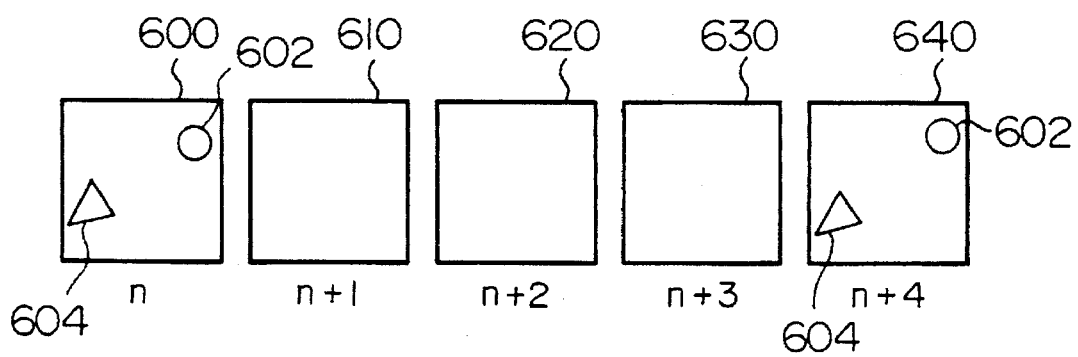
FIG. 11 is a plan view of the graphics copied on the final frame for an interpolation interval.
Figure 12:
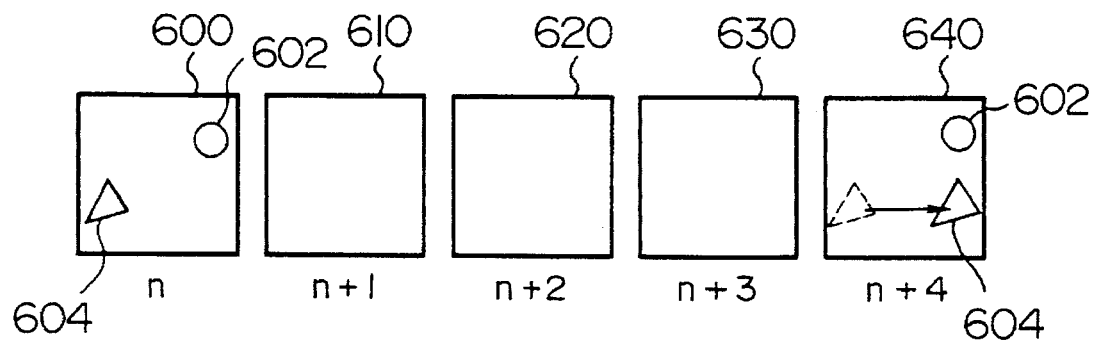
FIG. 12 is a diagram showing the specification of the final state of interpolation.
Figure 13:
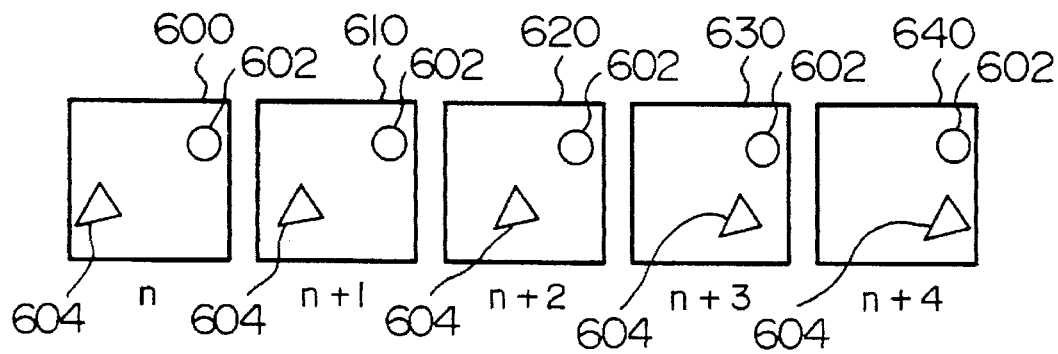
FIG. 13 is a diagram showing the relation between the frame and graphics at the time of completion of interpolation.

In FIG. 10, a FIG. 602 is drawn on the first frame 600 of the animation at step 1060. When the figure is completely drawn in the first frame 600, the frame 640 for the last frame of the animation is selected at step 1010. When at step 1050 the item, "interpolation" is selected from the editing menu 130, the interpolation command is executed, and the figure 602 drawn on the frame 600 is copied into the current frame 640 as shown in FIG. 11. At this time, the item, "interpolation" of the editing menu 130 is still selected, and is highlighted. The figure of the frame 640 is shifted right so that the final figure of the animation is drawn (step 1052). When the drawing of the final frame 640 has been finished, the item "interpolation" is again selected from the editing menu 130 (step 1054). Then, as shown in FIG. 13, figures for the interpolation between the frames 600 and 640 are produced in the frames 610, 620 and 630.

If the drawing of graphics has been completed (step 1000) after repetition of the above steps, the item "store" of the main control menu 120 is selected, and the produced graphics are stored in association with the frames (step 1080). When the item "execution" of the main control menu 120 is selected (step 1090), the presentation is executed. Upon execution, the video images from the video disk player are sequentially displayed. When the frames in which the graphics are drawn are displayed, they are compounded with the video images in accordance with the compounding method specified upon editing. When the frame in which the script is defined is displayed, the script is executed. Upon execution of the presentation, the item, "store" of the main control menu 120 is selected so long as there is no trouble, and the produced presentation is stored.

Figure 14:
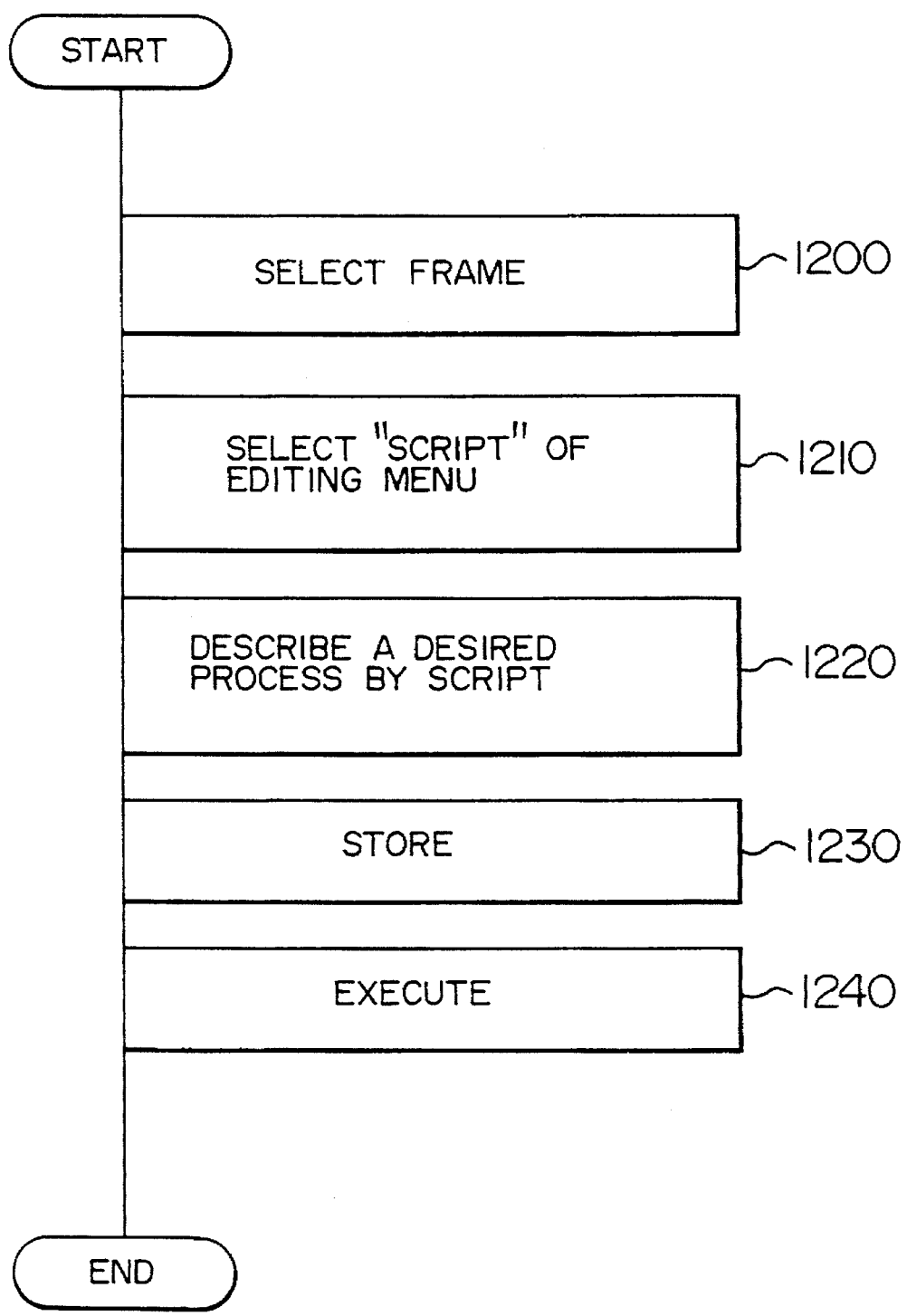
FIG. 14 is a PAD diagram showing the procedure for defining the processing on the frame.

When it is desired to execute a particular process on the specified, displayed frame, the script is defined for the frame. FIG. 14 shows an example of the procedure for defining the script. At step 1200, a frame in which the script is desired is selected and displayed on the editing region 200 by use of the video operation panel 160 and time line setting panel 260. The pointer 15 is placed on the portion in which no graphics are displayed, of the displayed frame, and the left button 51 of the mouse 50 is pushed down, selecting the displayed frame. Then, when at step 1210 the item "script" of the editing menu 130 is selected, the script editor is opened. At step 1220, a desired process is described on the script editor by use of a predetermined description language. The contents of the description are referred to as the script. At step 1230, the script is checked, and if no error is present, the script is stored (step 1230), ending the script editor. When the item "execution" of the main control menu 120 is selected, the video image is reproduced. When the frame in which the script is defined is displayed, the script is interpreted and executed.

Figure 15:
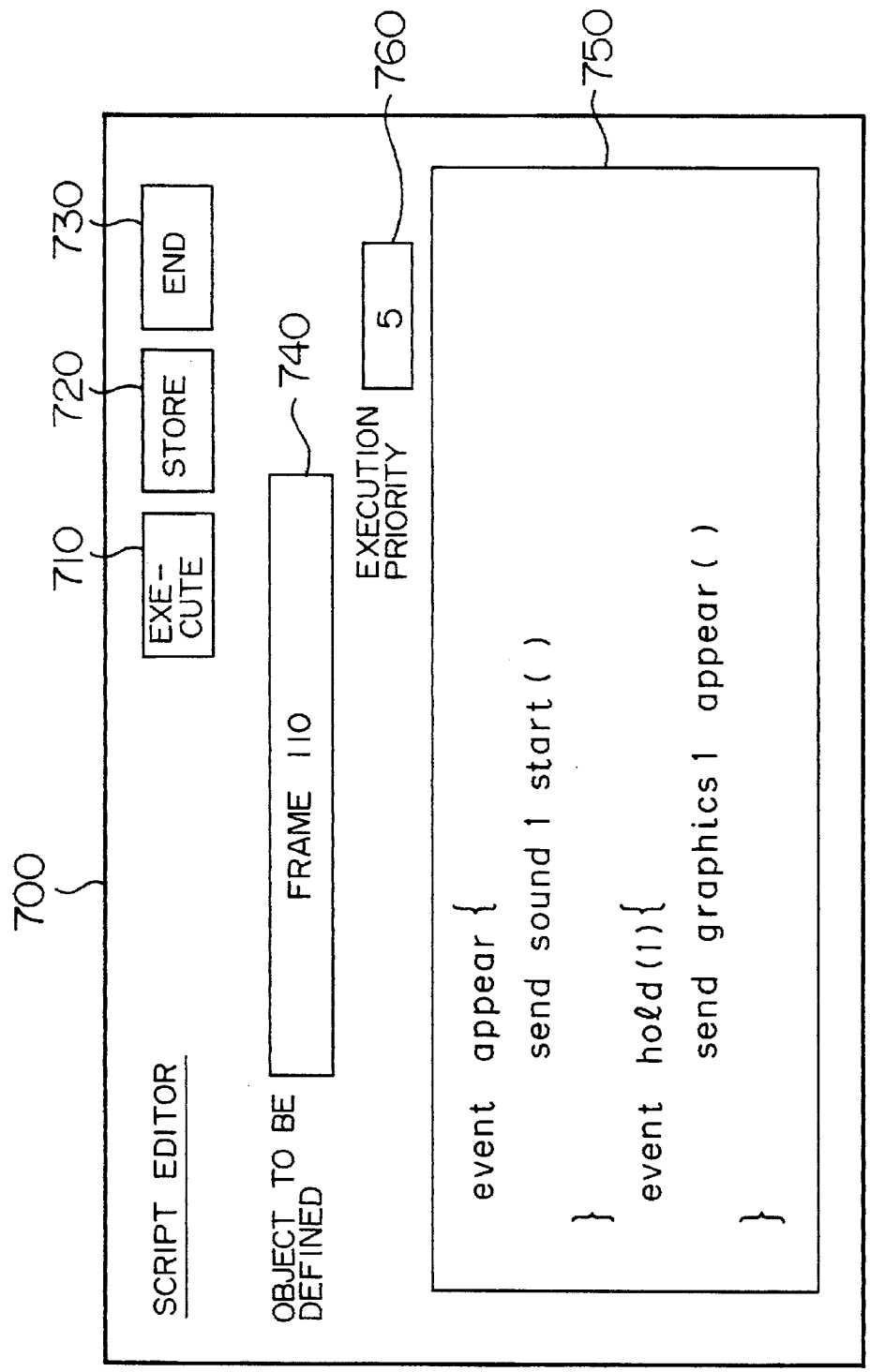
FIG. 15 is a diagram of the displayed script editor.

FIG. 15 shows the displayed state of the script editor on the screen. There are shown a script editor 700, an icon 710 for ordering the script to be executed, an icon 720 for ordering the script to be stored, an icon 730 for stopping the script editor, a letter row display region 740 for displaying an object for which the script is defined, a script editing region 750 for editing the script, and and execution priority input region 760 for specifying the priority at which the script described in the script editing region 750 is executed. When the script editor is opened after selecting a frame at step 1200, the name of the currently displayed frame is displayed on the text display region 740. In this embodiment, the name of the frame of the default is the word "frame" and the currently displayed frame number added to the end of the word. The frame name can be changed by operating the mouse 50 and keyboard 40 on the text display region 740.

The normal text input and editing operations are made by use of the mouse 50 and keyboard 40 so as to describe the script on the editing region 750. The general purpose programing language (C language, Pascal or others), or a proper programming language can be used for the description of the script. In this embodiment, the language of the type which will be described later (hereinafter, called the m language) is used for the description of the script. The process for an event occurring relative to an object is described in the m language with the statement, even name (device name) {process}

(this statement is called the event rule). The object is the object to be operated or processed, such as individual figure elements, or a collection of figure elements, constituting graphics. The event is the event occurring at the object, such as the display of the object, erasing of the object from the display and the operations (click, drag) of the mouse 50 on the object. When an event specified by an event name and a device name occurs at the object, the process defined within { } is executed. If the device name is not specified, a process is executed irrespective of the kind of the device when the event specified by the event name occurs.

The names of events and the meanings will be given below.

(1) hold

It occurs when the button of the mouse 50 is pushed down on an object. The device name has a numerical value of 1 or 2. The value 1 indicates the left button 51 and the value 2 indicates the right button 52.

(2) drag

The event occurs when the button of the mouse 50 is dragged on an object. The device name has a numerical value of 1 or 2. The value of 1 indicates the left button, and 2 indicates the right button 52.

(3) key-down

When the pointer 15 lies on an object, and when a key of the keyboard 40 is pushed down, it occurs. The name of the device takes a letter code corresponding to the key.

(4) key-up

When the pointer 15 lies on an object, and when a key of the keyboard 40 is released, it occurs. The name of the device takes a letter code corresponding to the key.

(5) appear

When a object is displayed, it occurs. There is no device name.

(6) disappear

When an object disappears from the display, it occurs. There is no device name.

In the item "process" of the event rule statement process, the following two statements can be written and combined with general control statements (statements for loop and branch).

(1) Transmission of a message to the object

Syntax: send object-name/message-name (subtraction number arrangement)

Meanings: to send a message specified by "message-name" to an object specified by "object-name". The process defined in the object is executed in accordance with the message.

(2) Call the routine described in another language

Syntax: call routine name (argument-list)

Meaning: to call a routine realized in another language (general purpose programing language such as C language) corresponding to "routine name".

Two event rules are described in the script editing region 750 in FIG. 15. The first statement means that "if a frame 110 is displayed, send a message of start ( ) to an object of sound 1". The second statement means that "if the left button 51 of the mouse 50 is pushed down on the frame 110, send a message of appear ( ) to an object of graphic 1".

Figure 16:
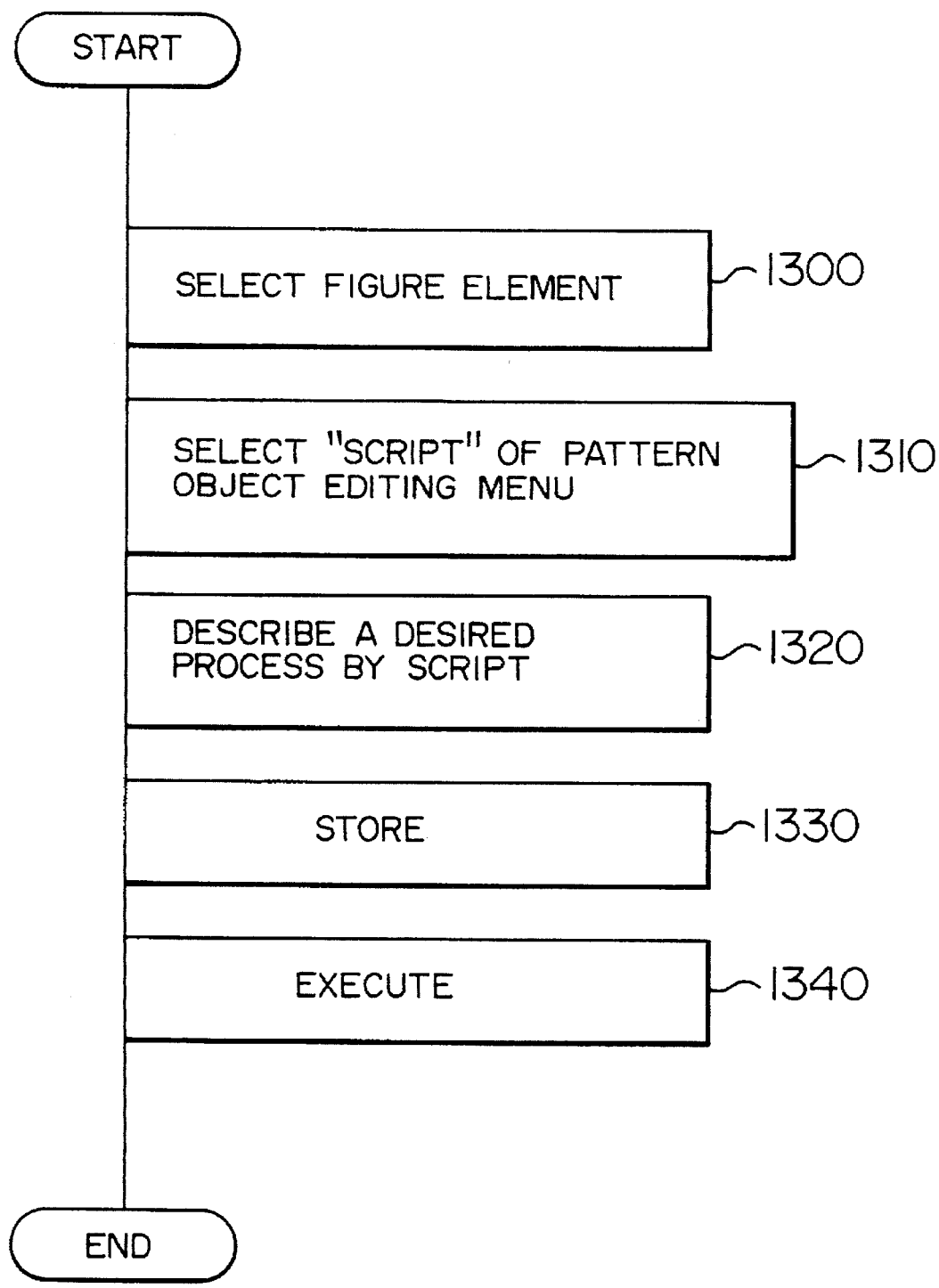
FIG. 16 is a PAD diagram showing the procedure for defining the processing on the graphics.

FIG. 16 shows the procedure for defining the script in the figure elements of graphics which are compounded with a video image and displayed. First, when at least one figure element is selected on the screen (step 1300), and when the item "script" of the figure object editing menu 220 is selected (step 1310), the script editor 700 is opened. When at step 1300 only one figure element is selected, the object name of the figure element is displayed on the text display region 740. When at step 1300 a plurality of figure elements are selected, an object for grouping the selected plurality of figure elements is generated, and the name of the object is displayed on the text display region 740. On the script editing region 750, the script is described (step 1320) and stored (step 1330). When the item "execution" of the main control menu 120 is selected, a video image is reproduced, and when a frame in which graphics are drawn is displayed, the graphics are compounded therewith and displayed. When the figure element in which the script is defined is operated by the mouse 50 while the graphics are being displayed, an event rule corresponding to the operation contents is invoked, and the process described in the event rule is executed.

Since the processing ability of the computer has a limit, the defined script cannot be always executed in synchronism with the progress of video images. If scripts for the execution of processes are defined for all frames, each script is required to have been completely executed until the next frame is displayed. If the video image reproducing speed is 30 frames/second, each process must be finished within 1/30 second. Thus, in this embodiment, when the execution of the script defined in a certain frame is not finished by the time when the frame defined in the next script is reproduced, one of the following execution control modes can be selected. This can minimize the effect of the asynchronism between the video image and the computer processing.

(1) However much the execution of script is delayed, the scripts defined in the respective frames are sequentially executed.

(2) The delayed process is not executed. In other words, when a certain frame n is displayed, and if the script defined in the previous frame m is being executed, the script defined in the frame n is not executed.

(3) Only a particularly specified part of the delayed process is sure to be executed after the script which is now being executed has been finished. In this embodiment, a script higher than a specified priority is executed.

(4) Only a particularly specified part of the delayed process is immediately executed after forcing the script which is being executed to be stopped. In this embodiment, a script higher than a specified priority is executed.

(5) A script higher in the priority than the currently executed script is immediately executed after forcing the current process to be stopped.

The priority of scripts can be specified by placing numerical values on the priority input region 760 of the script editor 700. When the main control menu 120 is selected, the execution control mode setting sheet is opened, and one of the above modes can be selected.

The effect of the invention will be described below.

(1) When video images are synchronized with computer processing, the operator only defines a desired process to be executed. It is not necessary to produce a program for such synchronized execution control that the computer processing is started while the video image progress is being monitored. In addition, when the process contents are defined, the operator only selects a video frame, so that it is possible to simply specify when the process is executed.

(2) When video images are synchronized with the computer graphic processing, the graphics to be compounded and displayed are drawn directly on the frame in which the video image and the graphics are to be compounded and displayed. Thus, the graphics can be simply drawn in accordance with the color, position and size of parts of the video image. Moreover, since the graphics are drawn directly on the frame, it is possible to implicitly specify when the graphics are displayed, and thus the synchronization between the graphics and the video image can be simply specified.

(3) Even if video images are reproduced at such a high speed that computer processing cannot keep up with the video reproduction, the disturbance of the synchronization can be minimized by properly selecting the method for the computer processing execution control (the delayed process is not executed, a specified process is sure to be executed, the execution is made on the basis of the priority and so on). Therefore, the operator does not need to be particularly conscious of the computer processing ability.

(4) Since computer processing to be executed in accordance with the user's operation can be defined for any figure element of graphics which is compounded with video images and displayed, it is possible to give the operator the feeling of directly operating parts of the video images under reproduction. Therefore, a user interface which is easier for the user can be constructed.

What is claimed is:

1. A procedure defining system for defining procedures to be executed in synchronism with display of video information made up of a plurality of frames, said procedure defining system comprising:

frame selecting means for selecting one of said plurality of frames of said video information;

procedure defining means for defining a procedure to be executed in synchronism with display of a frame selected by said frame selecting means during display of said video information including said frame; and storing means for storing said procedure defined by said procedure defining means in association with identification information of said frame selected by said frame selecting means.

2. A procedure defining system according to claim 1, wherein said procedure defining means defines a procedure as a script.

3. A procedure defining system according to claim 1, further comprising display means for displaying said frame selected by said frame selecting means as a still image during frame selection.

4. A procedure defining system according to claim 1, further comprising:

video display means for displaying said video information; and executing means for executing a procedure stored by said storing means in synchronism with display of a frame whose identification information is stored in association with said procedure when said frame is displayed during display of said video information including said frame by said video display means.

5. A procedure defining system according to claim 4, wherein, when a second process defined for a second piece of image information is being executed while a first piece of image information is being displayed, a first process defined for said first piece of image information is executed after said second process has been finished.

6. A procedure defining system according to claim 4, wherein when a first process is executed when a first piece of image information is displayed is not finished by a time when a second piece of image information is displayed, a second process defined for said second piece of image information is not executed.

7. A procedure defining system according to claim 4, wherein when a second process defined for a second piece of image information is being executed while a preselected first piece of image information is being displayed, a first process defined for said first piece of image information is executed after said second process has been finished.

8. A procedure defining system according to claim 4, wherein when a second process defined for a second piece of image information is being executed while a first piece of image information for which a first process has been defined is being displayed, said second process is interrupted and said first process is started.

9. A procedure defining system according to claim 4, wherein an execution preference degree is specified when a process is defined for a selected piece of image information, and when a second piece of image information for which a second process having a higher preference degree than a first process has been defined is being displayed while said first process defined for a first piece of image information is being executed, said first process is interrupted, and said second process is executed.

10. A graphics editing system for editing plurality of frames included in video information using graphical figures to be overlaid on a display of said video information, said graphics editing system comprising:

frame selecting means for selecting one of said plurality of frames of said video information;

display means for displaying a frame selected by said frame selecting means;

editing means for editing said frame displayed by said display means using graphical figures to be overlaid on said frame displayed by said display means; and storing means for storing said graphical figures to be overlaid on said frame edited by said editing means in association with identification information of said frame displayed by said display means and on which said graphical figures are to be overlaid.

11. A graphics editing system according to claim 10, further comprising:

retrieving means for retrieving said graphical figures stored by said storing means;

video display means for displaying said video information by displaying frames that said video information is composed of one by one in sequence at predetermined intervals;

said retrieving means retrieving said graphical figures stored in association with identification information of said frames being displayed by said video display means as said frames are displayed; and said video display means overlaying said graphical figures retrieved by said retrieving means on a display of said frames being displayed.

12. A graphics editing system according to claim 11, further comprising:

graphical figure selecting means for selecting at least one graphical figure from said graphical figures used to edit a frame by said editing means;

procedure defining means for defining a procedure for said graphical figure selected by said graphical figure selecting means;

procedure storing means for storing said procedure defined by said procedure defining means in association with identification information of said graphical figure selected by said graphical figure selecting means; and procedure executing means for executing said stored procedure when said graphical figure whose identification information is stored in association with said procedure is displayed by said video display means.

13. A graphic editing system according to claim 10, further comprising:

graphical figure selecting means for selecting at least one graphical figure from said graphical figures used to edit a frame by said editing means;

procedure defining means for defining a procedure for said graphical figure selected by said graphical figure selecting means; and procedure storing means for storing said procedure defined by said procedure defining means in association with identification information of said graphical figure selected by said graphical figure selecting means.

14. A procedure defining method for defining procedures to be executed in synchronism with display of video information made up of a plurality of frames, said procedure defining method comprising the steps of:

selecting one of said plurality of frames of said video information;

defining a procedure to be executed in synchronism with display of a selected frame during display of said video information including said frame; and storing said defined procedure in association with identification information of said frame selected by said frame selecting means.

15. A procedure defining method according to claim 14, wherein said procedure defining defines a procedure as a script.

16. A procedure defining method according to claim 14, further comprising the steps of:

displaying a selected frame as a still image during frame selection.

17. A procedure defining method according to claim 14, further comprising the steps of:

displaying said video information; and executing a stored procedure in synchronism with display of a frame whose identification information is stored in association with said procedure when said frame is displayed during display of said video information including said frame.

18. A procedure defining method according to claim 17, wherein, when a second process defined for a second piece of image information is being executed while a first piece of image information is being displayed, a first process defined for said first piece of image information is executed after said second process has been finished.

19. A procedure defining method according to claim 17, wherein when a first process is executed when a first piece of image information is displayed is not finished by a time when a second piece of image information is displayed, a second process defined for said second piece of image information is not executed.

20. A procedure defining method according to claim 17, wherein when a second process defined for a second piece of image information is being executed while a preselected first piece of image information is being displayed, a first process defined for said first piece of image information is executed after said second process has been finished.

21. A procedure defining method according to claim 17, wherein when a second process defined for a second piece of image information is being executed while a first piece of image information for which a first process has been defined is being displayed, said second process is interrupted and said first process is started.

22. A procedure defining method according to claim 17, wherein an execution preference degree is specified when a process is defined for a selected piece of image information, and when a second piece of image information for which a second process having a higher preference degree than a first process has been defined is being displayed while said first process defined for a first piece of image information is being executed, said first process is interrupted, and said second process is executed.

23. A graphics editing method for editing plurality of frames included in video information using graphical figures to be overlaid on a display of said video information, said method comprising the steps of:

selecting one of said plurality of frames of said video information;

displaying a selected frame;

editing said frame being displayed using graphical figures to be overlaid on said frame being displayed; and storing said graphical figures to be overlaid on said edited frame in association with identification information of said edited frame being displayed and on which said graphical figures are to be overlaid.

24. A graphics editing method according to claim 23, further comprising the steps of:

retrieving said stored graphical figures;

displaying said video information by displaying frames that said video information is composed of one by one in sequence at predetermined intervals;

said retrieving step retrieves said graphical figures stored in association with identification information of said frames being displayed as said frames are displayed; and overlaying said retrieved graphical figures on a display of said frames being displayed.

25. A graphics editing method according to claim 24, further comprising the steps of:

selecting at least one graphical figure from said graphical figures used to edit a frame;

defining a procedure for said selected graphical figure;

storing said defined graphical procedure in corresponding relationship with said selected figure; and executing said stored procedure when said graphical figure whose identification information is stored in association with said procedure is displayed.

26. A graphic editing method according to claim 23, further comprising the steps of:

selecting at least one graphical figure from said graphical figures used to edit a frame;

defining a procedure for said selected graphical figure; and storing said defined procedure in association with identification information of said selected graphical figure.

* * * * *